US012570000B2

(12) United States Patent     (10) Patent No.:   US 12,570,000 B2

Kikuchi et al.     (45) Date of Patent:     Mar. 10, 2026

(54) PALLETIZING SYSTEM AND EXTERNAL APPEARANCE INSPECTION APPARATUS

(71) Applicant: G-TEKT CORPORATION, Saitama-city (JP)

(72) Inventors: Wataru Kikuchi, Tochigi (JP); Toru Murayama, Nagano (JP)

(73) Assignee: G-TEKT CORPORATION, Saitama-City (JP)

( * ) Notice: Subject to any disclaimer, the term of this patent is extended or adjusted under 35 U.S.C. 154(b) by 206 days.

(21) Appl. No.: 18/264,582

(22) PCT Filed: Feb. 8, 2022

(86) PCT No.: PCT/JP2022/004833

§ 371 (c)(1),
(2) Date: Aug. 8, 2023

(87) PCT Pub. No.: WO2022/168985

PCT Pub. Date: Aug. 11, 2022

(65) Prior Publication Data

US 2024/0116182 A1    Apr. 11, 2024

(30) Foreign Application Priority Data

Feb. 8, 2021   (JP) ................................. 2021-018010
Apr. 19, 2021   (JP) ................................. 2021-070138
Jul. 14, 2021   (JP) ................................. 2021-116287

(51) Int. Cl.
B25J 9/00      (2006.01)
B25J 9/16      (2006.01)
(Continued)

(52) U.S. Cl.
CPC ........... B25J 9/1687 (2013.01); B25J 9/0084 (2013.01); B25J 9/0093 (2013.01); B25J 9/1697 (2013.01); B25J 13/085 (2013.01); B25J 15/0616 (2013.01)

(58) Field of Classification Search
CPC ...... B25J 9/1687; B25J 9/0084; B25J 9/0093; B25J 9/1697; B25J 13/085; B25J 15/0616;
(Continued)

(56) References Cited

U.S. PATENT DOCUMENTS

| | | | | |
|---|---|---|---|---|
| 2004/0086364 | A1* | 5/2004 | Watanabe .............. | B25J 9/0084 |
| | | | | 414/416.01 |
| 2010/0266380 | A1* | 10/2010 | Dorner ................. | B65H 3/0816 |
| | | | | 414/797 |

(Continued)

FOREIGN PATENT DOCUMENTS

| | | |
|---|---|---|
| CN | 102616578 A | 8/2012 |
| CN | 105947293 A | 9/2016 |

(Continued)

OTHER PUBLICATIONS

Daniel Olivier; FR3095431A1.translate; Dispositif De Manipulation De Recipients. (Year: 2020).*

(Continued)

*Primary Examiner* — B M M Hannan

(74) *Attorney, Agent, or Firm* — WOMBLE BOND DICKINSON (US) LLP

(57) ABSTRACT

A first robot (104) is arranged in association with a belt conveyor (101), and performs a first transfer operation of picking up a product such as a blank material conveyed by the belt conveyor (101) and stacking it on a relay table (102). A second robot (108) performs a second transfer operation
(Continued)

of transferring a loaded body of a plurality of blank materials stacked on the relay table (102) to a pallet table (103).

15 Claims, 7 Drawing Sheets

(51) Int. Cl.
  B25J 13/08       (2006.01)
  B25J 15/06       (2006.01)
(58) Field of Classification Search
  CPC .......... B25J 15/10; B21D 28/02; B21D 43/22;
           B21D 43/24; B21D 43/287; G05B
           2219/40036; G05B 2219/40053; G05B
           2219/40306; G05B 2219/40607; G05B
           2219/40006; G05B 19/4182
  USPC ........................................................ 700/259
  See application file for complete search history.

(56)              References Cited

U.S. PATENT DOCUMENTS

| | | | |
|---|---|---|---|
| 2015/0081090 A1 | 3/2015 | Dong | |
| 2018/0022557 A1 | 1/2018 | Tanaka et al. | |
| 2018/0044123 A1 | 2/2018 | Omiya | |
| 2018/0071808 A1 | 3/2018 | Viñuales Duesa et al. | |
| 2018/0117766 A1* | 5/2018 | Atohira .................. | B25J 9/1671 |
| 2019/0256300 A1 | 8/2019 | Shimamura et al. | |
| 2019/0256301 A1* | 8/2019 | Hashimoto .............. | B25J 15/04 |
| 2020/0270071 A1 | 8/2020 | Chavez et al. | |

FOREIGN PATENT DOCUMENTS

| | | | |
|---|---|---|---|
| CN | 205861564 U | 1/2017 |
| CN | 107640603 A | 1/2018 |
| CN | 111843981 A | 10/2020 |
| CN | 112296994 A | 2/2021 |
| EP | 2399850 A1 | 12/2011 |
| FR | 3095431 A1 | 10/2020 |
| JP | 05-071495 B2 | 10/1993 |
| JP | 06-064755 A | 3/1994 |
| JP | 09-202452 A | 8/1997 |
| JP | 2000-015370 A | 1/2000 |
| JP | 2004-203001 A | 7/2004 |
| JP | 3973595 B2 | 9/2007 |
| JP | 4073713 B2 | 4/2008 |
| JP | 2008-127029 A | 6/2008 |
| JP | 2008-264870 A | 11/2008 |
| JP | 2011-143497 A | 7/2011 |
| JP | 2013-142635 A | 7/2013 |
| JP | 2017-150992 A | 8/2017 |
| JP | 2018-510783 A | 4/2018 |
| JP | 2019-141935 A | 8/2019 |
| JP | 2021-016932 A | 2/2021 |
| WO | 2013/105532 A1 | 7/2013 |
| WO | 2014/125767 A1 | 8/2014 |
| WO | 2019/123578 A1 | 6/2019 |

OTHER PUBLICATIONS

International Preliminary Report on Patentability received for PCT Patent Application No. PCT/JP2022/004833, mailed on Aug. 17, 2023, 13 pages (7 pages of English Translation and 6 pages of Original Document).

International Search Report and Written Opinion received for PCT Patent Application No. PCT/JP2022/004833, mailed on May 10, 2022, 17 pages (8 pages of English Translation and 9 pages of Original Document).

Office Action received for Japanese Patent Application No. 2021-070138, mailed on Apr. 19, 2021, 40 pages (20 pages of English Translation and 20 pages of Original Document).

Office Action received for Japanese Patent Application No. 2021-070138, mailed on Jun. 28, 2021, 10 pages (5 pages of English Translation and 5 pages of Original Document).

Office Action received for Japanese Patent Application No. 2021-070138, mailed on Nov. 5, 2021, 6 pages (3 pages of English Translation and 3 pages of Original Document).

Supplementary European Search Report and Search Opinion received for European Application No. 22749856.5, mailed on Dec. 3, 2024, 13 pages.

CN Office Action, including Search Report received for Chinese Patent Application No. 202280014022.6, mailed on May 15, 2025, 16 pages (6 pages of English Translation and 10 pages of Original Document).

\* cited by examiner

208a

208

208b

208c

208c

208c

208d

208d

211

211c    211a 211b    211d

202

214

PALLETIZING SYSTEM AND EXTERNAL APPEARANCE INSPECTION APPARATUS

TECHNICAL FIELD

The present invention relates to a palletizing system that loads a blank material made of steel on a pallet, and an external appearance inspection apparatus that inspects a blank material or the like.

BACKGROUND ART

For example, in the manufacture of transmission parts, a disc-shaped blank material is produced by punching a rolled steel sheet, and the produced blank material is press-formed, thereby producing a part (product). In the manufacturing step of this type, the produced product is loaded on a container such as a pallet, and the pallet with the loaded product is transferred to the manufacturing department of the next step.

In the above-described loading (palletization) of the product, in general, the press-formed and unloaded product is manually loaded on the pallet. In addition, external appearance inspection or the like is performed at the time of loading. Since a punched product is produced at a production speed of about 1.3 sec/piece, the speed of manual processing of one person is limited, resulting in many problems such as requirement of much manpower. For this reason, mechanizing palletization has been examined.

In this mechanization, in a step of conveying a produced product by a conveyance apparatus such as a belt conveyor, the external appearance is captured using a camera, and the captured image is processed, thereby executing external appearance inspection. It is considered that after that, the product conveyed by the belt conveyor is picked up by a robot arm and loaded on a pallet. For example, the product conveyed by the belt conveyor can be picked up by conveyor tracking using well-known vision tracking (see patent literature 1).

RELATED ART LITERATURE

Patent Literature

Patent Literature 1: Japanese Patent Laid-Open No. 2019-141935

DISCLOSURE OF INVENTION

Problem to be Solved by the Invention

However, in the above-described mechanization technique as well, since products are loaded one by one on a container by a robot, the loading speed cannot keep up with the processing speed of product production or the like in some cases. It is considered that to make the speed of loading by the robot keep up with the processing speed of products, the number of robots is increased. However, the width of the belt conveyor is limited, and the number of robots that can be handled is also limited.

As described above, in the conventional technique, the loading speed does not keep up with the processing speed of products.

The present invention has been made to solve the above-described problem, and has as its object to easily load a product in correspondence with the processing speed of the product.

Means of Solution to the Problem

According to the present invention, there is provided a palletizing system comprising a belt conveyor configured to convey a plate-shaped blank material from a first area to a second area, a relay table arranged beside the belt conveyor in the second area, a pallet table arranged in the second area in a state in which the relay table is sandwiched between the pallet table and an arrangement area of the belt conveyor, a first robot arranged in association with the belt conveyor and configured to perform a first transfer operation of picking up the blank material conveyed by the belt conveyor and stacking the blank material on the relay table, a camera configured to capture the blank material conveyed by the belt conveyor, an image processing apparatus configured to perform image measurement for an image captured by the camera, a first controller configured to instruct the first robot to perform the first transfer operation based on an image measurement result by the image processing apparatus, a second robot configured to perform a second transfer operation of transferring a loaded body of a plurality of blank materials stacked on the relay table to the pallet table, a measuring apparatus configured to measure a load amount of the plurality of blank materials stacked on the relay table, and a second controller configured to instruct the second robot to perform the second transfer operation if the load amount measured by the measuring apparatus reaches a set value.

According to the present invention, there is also provided a palletizing system comprising a conveyance apparatus configured to convey a product from a first area to a second area, a relay table arranged beside the conveyance apparatus in the second area, a container arranged in the second area in a state in which the relay table is sandwiched between the container and an arrangement area of the conveyance apparatus, a first robot arranged in association with the conveyance apparatus and configured to perform a first transfer operation of picking up the product being conveyed by the conveyance apparatus and stacking the product on the relay table, a camera configured to capture the product being conveyed by the conveyance apparatus, an image processing apparatus configured to perform image measurement for an image captured by the camera, a first controller configured to instruct the first robot to perform the first transfer operation based on an image measurement result by the image processing apparatus, and a second robot configured to perform a second transfer operation of transferring a loaded body of a plurality of products stacked on the relay table to the container.

Also, according to the present invention, there is provided an external appearance inspection apparatus configured to perform image recognition of an external appearance image acquired by capturing a plate-shaped blank material, thereby executing inspection of an external appearance of the blank material, comprising a first belt conveyor configured to convey the blank material, a second belt conveyor arranged to continue from the first belt conveyor while interposing a gap therebetween and configured to convey the blank material conveyed by the first belt conveyor, a first camera arranged on an upper side of the first belt conveyor and the second belt conveyor and configured to capture an obverse surface of the blank material conveyed by the first belt conveyor and the second belt conveyor, thereby acquiring an external appearance image of the obverse surface of the blank material, a first illumination arranged on the upper side of the first belt conveyor and the second belt conveyor and used to capture the obverse surface of the blank material by the first camera, a second camera arranged on a lower side of the first belt conveyor and the second belt conveyor and configured to capture, from the gap, a reverse surface of the blank material conveyed by the first belt conveyor and the second belt conveyor, thereby acquiring an external appearance image of the reverse surface of the blank material, and a second illumination arranged on the lower side of the first belt conveyor and the second belt conveyor and used to capture the reverse surface of the blank material by the second camera, wherein an image capturing point of the first camera is arranged at a point deviated from above the gap in a conveyance direction.

In addition, the palletizing system according to the present invention can comprise an external appearance inspection apparatus configured to inspect an external appearance of the blank material conveyed by the belt conveyor between the first area and the second area.

Effect of the Invention

As described above, according to the present invention, it is possible to load a blank material on a pallet in correspondence with the production speed of the blank material.

BEST MODE FOR CARRYING OUT THE INVENTION

The present invention will now be described.

First Embodiment

Figure 1:
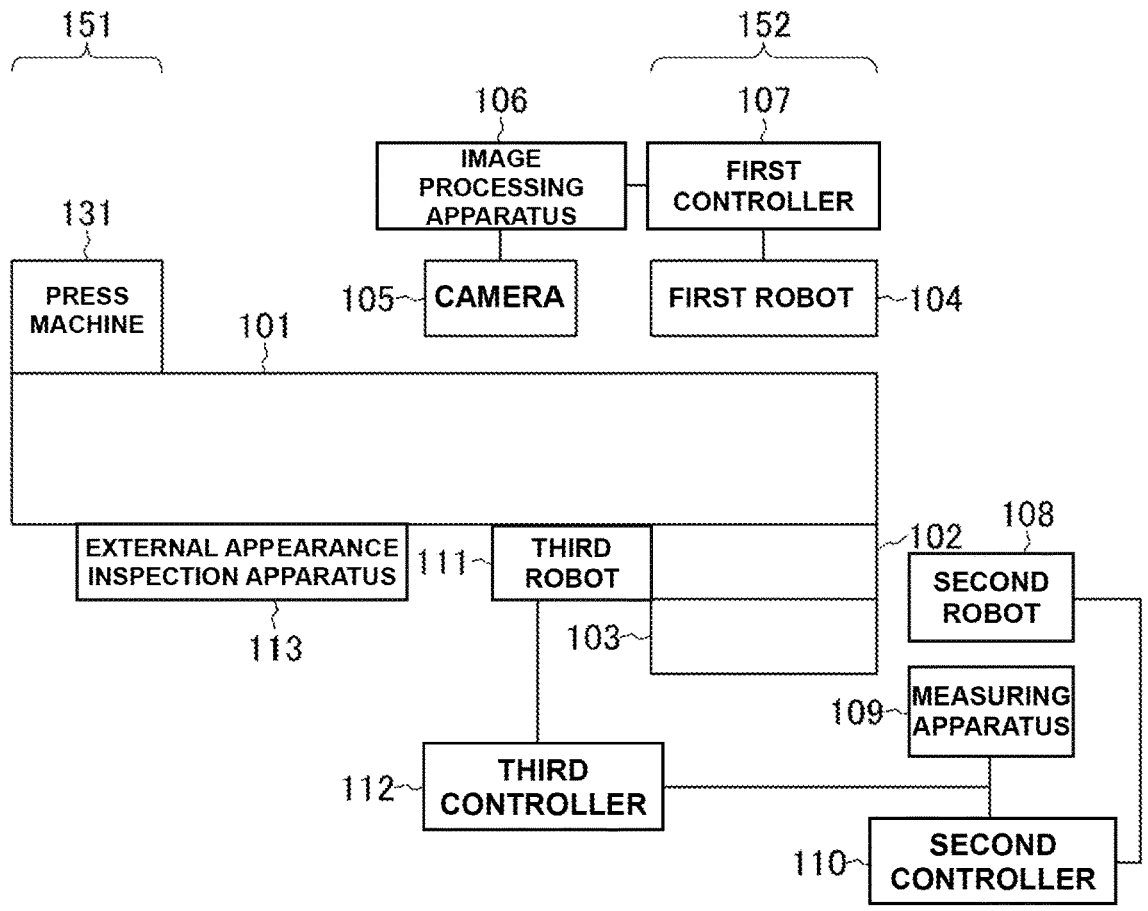
FIG. 1 is a view showing the configuration of a palletizing system according to the first embodiment of the present invention.

A palletizing system according to the first embodiment of the present invention will be described first with reference to FIG. 1. The palletizing system includes a belt conveyor 101, a relay table 102, a pallet table 103, a first robot 104, a camera 105, an image processing apparatus 106, a first controller 107, and a second robot 108.

The belt conveyor 101 conveys a plate-shaped blank material from a first area 151 to a second area 152. For example, a press machine 131 is arranged in the first area 151, and a blank material punched by the press machine 131 and unloaded is discharged to the first area 151 of the belt conveyor 101. The blank material has, for example, a plate thickness of about 2.3 to 6 mm and a round or polygonal outer shape. There is also a blank material having an annular shape with a hole at the center in a planar view.

The relay table 102 is arranged on a side of the belt conveyor 101 in the second area 152. The pallet table 103 is arranged in the second area 152 in a state in which the relay table 102 is sandwiched between the pallet table 103 and the arrangement area of the belt conveyor 101.

Figure 2:
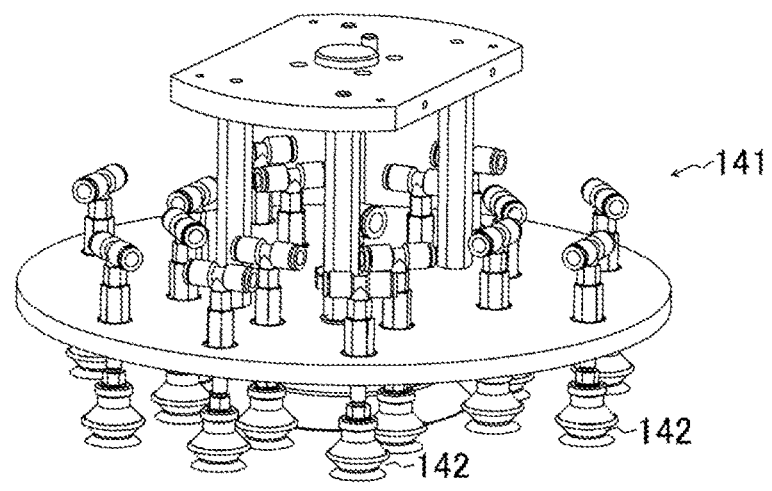
FIG. 2 is a perspective view showing the configuration of a suction head 141 provided on a first robot 104 of the palletizing system according to the first embodiment of the present invention.

The first robot 104 is arranged in association with the belt conveyor 101, and performs a first transfer operation of picking up the blank material conveyed by the belt conveyor 101 and stacking it on the relay table 102. The first robot 104 is, for example, a parallel link robot. Also, the first robot 104 includes, for example, a vacuum suction type suction head 141 that picks up the blank material by suction, as shown in FIG. 2. The suction head 141 includes a plurality of suction pads 142.

The camera 105 captures the blank material conveyed by the belt conveyor 101. The image processing apparatus 106 performs image measurement for the image captured by the camera 105. Based on the image measurement result by the image processing apparatus 106, the first controller 107 instructs the first robot 104 to perform the first transfer operation.

Also, as an image plan, for a blank material having a polygonal outer shape, the image processing apparatus 106 can rotate the blank material picked up by the first robot 104 in a plane such that the positions of sides on side portions match (overlap) in a state in which a plurality of blank materials are stacked. For example, based on the image captured by the camera 105, the blank material is rotated such that the position of each side of the recognized outer shape is set in a set state. By the first transfer operation of the first robot 104 that operates based on the result of the image plan, in a loaded body of a plurality of polygonal blank materials stacked on the relay table 102, the positions of the sides of the blank materials substantially match. Note that the above-described operation is not necessary for a circular blank material.

If the camera 105 is formed by an area image sensor including 1,280·1,024 pixels, recognition of the outer shape of the blank material by the image processing apparatus 106 is possible. The larger the number of pixels of the area image sensor is, the more the identification accuracy of the outer shape of the blank material is improved, and the more the identification accuracy of the outer shape is improved.

Figure 3:
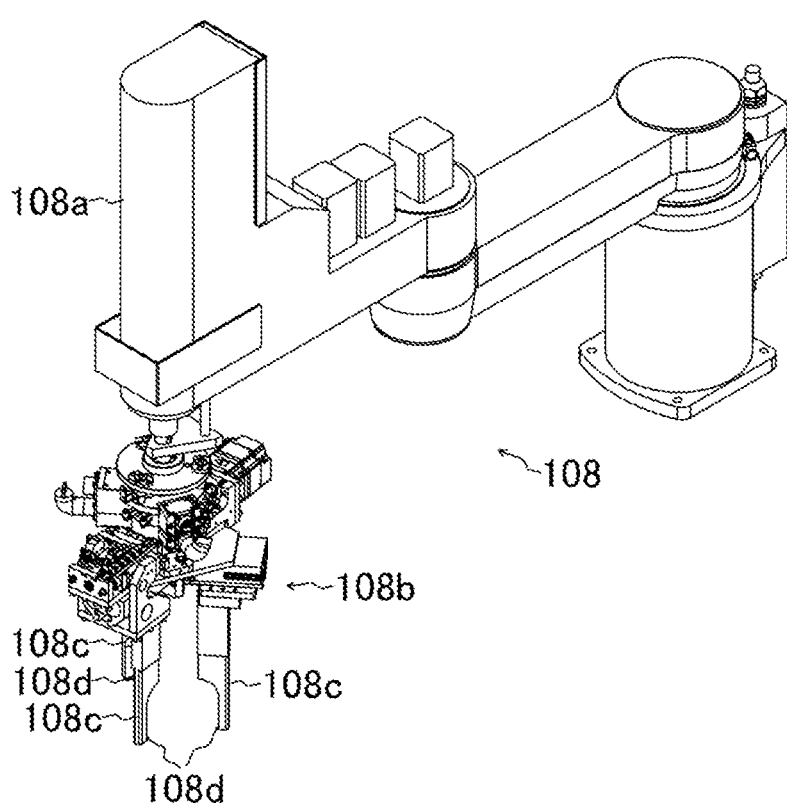
FIG. 3 is a perspective view showing a detailed example of the configuration of a second robot 108.

The second robot 108 performs a second transfer operation of transferring the loaded body of the plurality of blank materials stacked on the relay table 102 to the pallet table 103. For example, as shown in FIG. 3, the second robot 108 is a horizontal articulated robot arm, and includes a lifting mechanism 108a at the arm distal end portion. The movable range of the arm distal end portion of the second robot 108 is about 1,200 mm in the rotating direction and about 2,400 mm in the expansion/contraction direction.

Also, the lifting mechanism 108a includes a robot hand 108b formed by three claw members 108c configured to grip the loaded body from side surfaces. Each claw member 108c includes, at the distal end, a claw portion 108d formed into an L shape. The claw member 108c extends downward from the robot hand 108b. The claw portion 108d extends in a direction substantially vertical to the extending direction of the claw member 108c toward the center of the robot hand 108b. The robot hand 108b clamps the loaded body from the side surfaces by the claw members 108c and makes the claw portions 108d hooked on the end portions of the lowermost surface of the loaded body, thereby gripping and transferring the loaded body. The length of the claw portion 108d is, for example, 2 mm. In addition, the robot hand 108b can grip/transfer a loaded body of blank materials having an outer diameter of 1,100 mm to 3,440 mm.

Here, before the loaded body is gripped from the side surfaces by the robot hand, the second robot 108 performs a correction operation of correcting the disturbance of overlap in the loaded body by an operation of clamping the loaded body from the side surfaces by the three claw members 108c of the robot hand 108b, and then starts the gripping operation of the loaded body.

A measuring apparatus 109 measures the load amount of the plurality of blank materials stacked on the relay table 102. If the load amount measured by the measuring apparatus 109 reaches a set value, a second controller 110 instructs the second robot 108 to perform the second transfer operation. For example, the load amount can be the number of the plurality of loaded blank materials stacked on the relay table 102. Also, the load amount can be the weight (total weight) of the plurality of blank materials stacked on the relay table 102. For example, if the number of loaded blank materials counted by the measuring apparatus 109 reaches a set value of 11 to 13, the second controller 110 instructs the second robot 108 to perform the second transfer operation. For such a number of blank materials, the second transfer operation by the second robot 108 can sufficiently be performed.

The palletizing system also includes a third robot 111 provided on the relay table 102, and a third controller 112. If a new blank material is stacked on the loaded body already stacked on the relay table 102, the third controller 112 instructs the third robot 111 to perform the correction operation of correcting the disturbance of overlap in the loaded body. The third controller 112 grasps the stack of the new blank material based on, for example, the number of loaded blank materials counted by the measuring apparatus 109.

Figure 4:
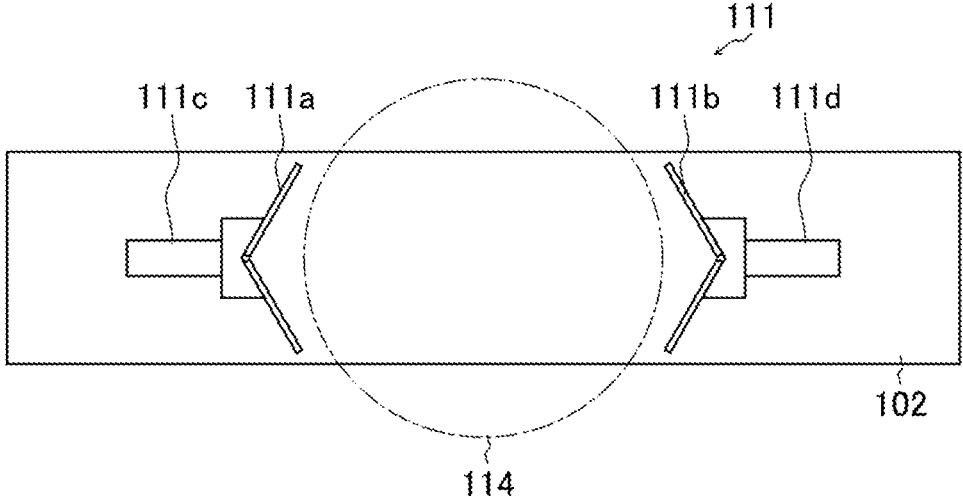
FIG. 4 is a plan view showing an example of the configuration of a third robot 111.

For example, as shown in FIG. 4, the third robot 111 includes a plurality of press plates 111a and 111b that move in directions for clamping a loaded body 114 of a plurality of blank materials stacked on the relay table 102 from the side surfaces of the loaded body 114. The plurality of press plates 111a and 111b are moved by actuators 111c and 111d in the directions for clamping the loaded body 114 from the side surfaces, thereby executing the above-described correction operation. The actuators 111c and 111d have a capability of a maximum portable mass of about 40 kg in the horizontal direction.

Also, as described above, if the positions of the sides of blank materials substantially match in the loaded body of the plurality of polygonal blank materials stacked on the relay table 102, by the above-described correction operation of the third robot 111, even in a case of polygonal blank materials, the disturbance of overlap in the loaded body can be eliminated to obtain a state in which the positions of the corresponding sides of the blank materials match. In this state, a problem that a blank material falls in the second transfer operation by the above-described second robot 108 never arises.

Also, the palletizing system includes an external appearance inspection apparatus 113 that inspects the external appearance of the blank material conveyed by the belt conveyor 101 between the first area 151 and the second area 152. The external appearance inspection apparatus 113 performs image recognition of an external appearance image acquired by capturing the blank material conveyed by the belt conveyor 101, thereby executing inspection of the external appearance of the blank material.

For example, the external appearance inspection apparatus 113 includes a linear image sensor, and a determination apparatus that determines the external appearance by processing an image captured by the linear image sensor. For example, the external appearance of the conveyed blank material is captured by the linear image sensor, and the external appearance is determined by the determination apparatus by performing pattern recognition using machine learning (deep machine learning) for the external appearance image obtained by the image capturing, thereby executing inspection of the external appearance of the blank material. The above-described linear image sensor can improve detection sensitivity for a fine flaw or the like by, for example, setting the number of pixels to 6,000 or more.

In the above-described palletizing system, first, if the blank material punched by the press machine 131 and unloaded is discharged to the first area 151 of the belt conveyor 101, the blank material is transported by the belt conveyor 101 in the direction of the second area 152. In this process, the external appearance inspection apparatus 113 inspects the external appearance of the blank material. A blank material determined as a failure in this inspection is removed from the belt conveyor 101.

Next, the blank material transported by the belt conveyor 101 is captured by the camera 105. The image (moving image) of the blank material under conveyance, which is captured by the camera 105, undergoes image measurement by the image processing apparatus 106. Based on the image measurement result by the image processing apparatus 106, the first controller 107 grasps the position of the conveyed blank material, and instructs the first robot 104 to perform the first transfer operation of the target blank material. In response to the instruction, the first robot 104 picks up the blank material conveyed by the belt conveyor 101 and stacks it on the relay table 102.

By the above-described process, the blank materials are stacked on the relay table 102 to form a loaded body. The measuring apparatus 109 counts the number of loaded blank materials stacked on the relay table 102. If the count value (the number of loaded blank materials) reaches a set value, the second controller 110 instructs the second robot 108 to perform the second transfer operation. In response to the instruction, the second robot 108 transfers the loaded body of the plurality of blank materials stacked on the relay table 102 to the pallet table 103. The second robot 108 loads the loaded body on a pallet placed on the pallet table 103. The pallet is, for example, a box having a size of about 1,475 mm·1,120 mm in a planar view and a height (depth) of about 520 mm. The size of the pallet can appropriately be set based on the movable range of the second robot 108.

The second robot 108 first moves the arm distal end portion to above the loaded body, lowers the robot hand 108b by the lifting mechanism 108a, and grips the loaded body by the robot hand 108b. When the robot hand 108b grips the loaded body, the lifting mechanism 108a raises the robot hand 108b. Next, the second robot 108 moves the arm distal end portion to a predetermined position above the pallet table 103, lowers the robot hand 108b by the lifting mechanism 108a, and places the gripped loaded body on the pallet table 103. After that, the second robot 108 cancels the grip operation of the loaded body by the robot hand 108b and returns to the initial state.

Here, since a lot of blank materials sequentially conveyed by the belt conveyor 101 are quickly transferred to the relay table 102 in the first transfer operation by the first robot 104, overlap in the loaded body is disturbed. If the loaded body is transferred to the pallet table 103 in this state, the loaded body with the disturbance of overlap is loaded on the pallet table 103. The loaded body is conveyed to the next step and used. In the next step, the blank material is picked up one by one from the loaded body. In the loaded body with the disturbance of overlap, the pickup position changes. In this state, for example, a problem such as a pickup failure occurs.

For this reason, it is important to correct the disturbance of overlap in the loaded body before the transfer to the next step. Before gripping the loaded body from the side surfaces by the robot hand 108b, the second robot 108 performs a correction operation of correcting the disturbance of overlap in the loaded body by an operation of clamping the loaded body from the side surfaces by the three claw members 108c of the robot hand 108b, and then starts the grip operation of the loaded body.

Since the above-described robot hand 108b cannot apply a large force in the clamping direction, it may be impossible to completely correct the disturbance of overlap in the loaded body. Hence, every time a new blank material is stacked on the loaded body already stacked on the relay table 102, the disturbance of overlap in the loaded body is corrected by the third robot 111. The third robot 111 can be specialized to the above-described correction of the disturbance of overlap in the loaded body and need not have a function of picking up the loaded body upward.

For example, the third robot 111 moves the plurality of press plates 111a and 111b by the actuators 111c and 111d in the direction of the loaded body 114 placed therebetween and clamps the loaded body 114 from the side surfaces by the press plates 111a and 111b, thereby correcting the disturbance of overlap in the loaded body 114. The actuators 111c and 111d can be, for example, arranged while being fixed on the relay table 102, and can perform the operation of clamping the loaded body 114 from the side surfaces with a stronger force by the press plates 111a and 111b. Hence, correction of the disturbance of overlap by a large deviation can be performed by using the third robot 111.

Thus, if the disturbance of overlap in the loaded body caused by a large deviation is corrected by the third robot 111, the disturbance of overlap in the loaded body can completely be corrected by the grip operation of the robot hand 108b of the second robot 108.

The palletizing system can be configured to include a plurality of first robots 104. In this case, the first controller 107 instructs each of the plurality of first robots 104 to perform the first transfer operation. Also, the palletizing system can include a plurality of relay tables 102. In this case, a plurality of pallet tables 103 are provided in correspondence with the plurality of relay tables 102 provided. In addition, the second robot 108 is provided in correspondence with each of the plurality of relay tables 102 provided, and the second controller 110 instructs each of the plurality of second robots 108 to perform the second transfer operation. Note that according to the palletizing system of the above-described first embodiment, since the relay table 102 is provided to enable quicker palletization, palletization corresponding to the production speed of blank materials can be performed in a small space without increasing the number of first robots 104.

Additionally, in the palletizing system, a reversing apparatus that reverses the blank material conveyed by the belt conveyor 101 can be provided, for example, before the arrangement place of the camera 105. The reversing apparatus can be arranged, for example, between the external appearance inspection apparatus 113 and the camera 105. For example, the belt conveyor 101 is formed by a first belt conveyor on the press machine side and a second belt conveyor on the side where the camera 105 and the like are arranged, and the reversing apparatus is provided between the first belt conveyor and the second belt conveyor.

The reversing apparatus can be formed by a rotation body including a plurality of radially provided radial storage portions and configured to receive a blank loaded from the first belt conveyor one by one, reverse the blank, and arrange it on the second belt conveyor. If one blank is supplied from the delivery end of the first belt conveyor to a predetermined radial storage portion of the rotation body, the rotation body intermittently rotates by one section (one piece) in a predetermined direction in accordance with a blank detection signal of a sensor. When the radial storage portion rotates by about 180 from the blank receiving position, the blank conveyed by the radial storage portion is arranged on the second belt conveyor.

For example, the cut surface of a blank material punched by the press machine 131 and unloaded is sometimes not vertical but tilted with respect to the plane of the blank material. If the next step is performed in a state in which the tilt is in the punching direction, a defect may occur. Hence, in the next step, the state of the cut surface of the blank material is confirmed, and the blank material is reversed as needed, resulting in a load in work. However, if the blank material is reversed by the above-described reversing apparatus to form the loaded body, reduction of the load in work or solution of a problem in the next step can be implemented.

As described above, according to the first embodiment, since the relay table is provided, and the loaded body of a plurality of blank materials stacked on the relay table by the first robot is transferred to the pallet table by the second robot, the blank material can be stacked on the pallet in correspondence with the production speed of the blank materials.

According to the first embodiment, as described above, since the relay table and the second robot are used, in the first robot, it is possible to perform control in which the blank materials being conveyed by the belt conveyor can be picked up more quickly by allowing disturbance of overlap to occur in the loaded body formed by stacking the blank materials.

In the first robot, it may be impossible to store more loaded bodies on a wider pallet table because the moving range of the blank material is limited. However, according to the present invention, since the relay table and the second robot are used, the blank material (loaded body) can be moved to a range that cannot be reached only by the first robot, and therefore, more loaded bodies can be stored on a wider pallet table.

Second Embodiment

Figure 5:
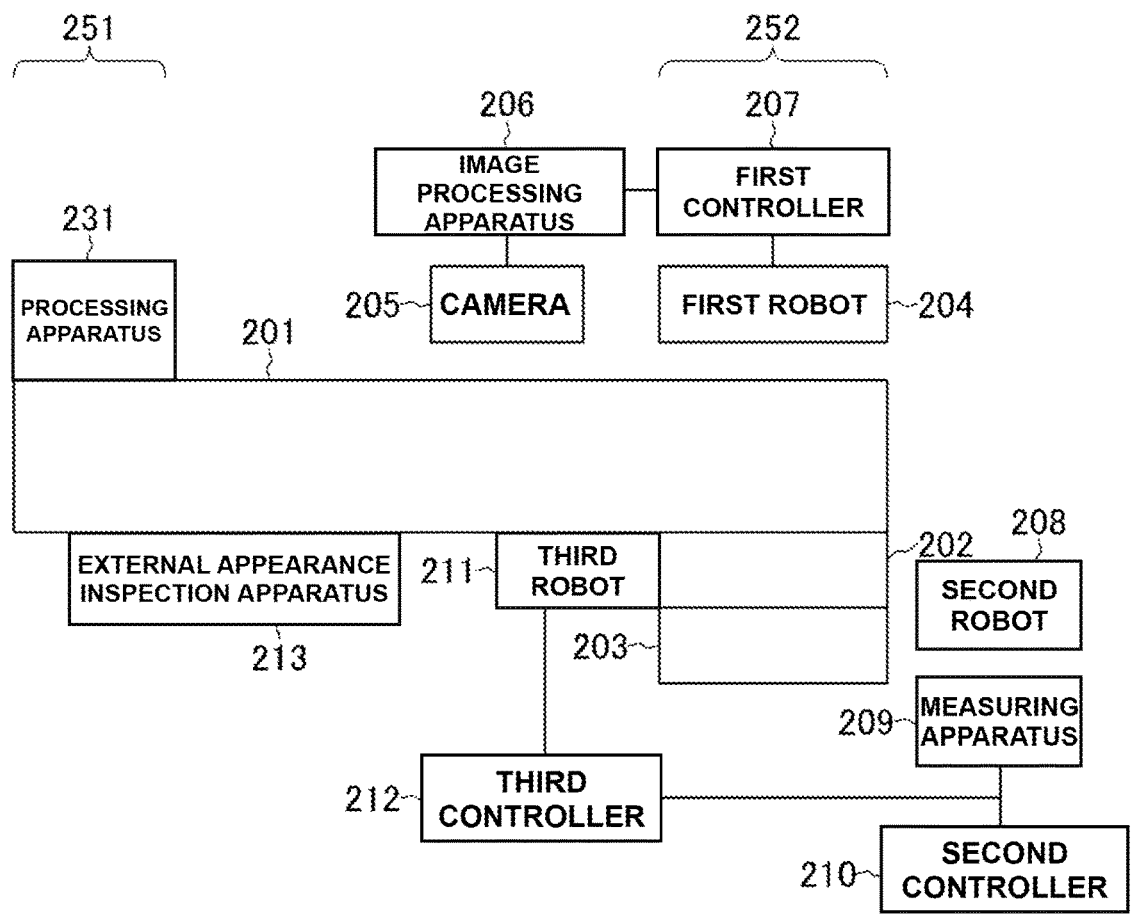
FIG. 5 is a view showing the configuration of a palletizing system according to the second embodiment of the present invention.

A palletizing system according to the second embodiment of the present invention will be described next with reference to FIG. 5. The palletizing system includes a conveyance apparatus 201, a relay table 202, a container 203, a first robot 204, a camera 205, an image processing apparatus 206, a first controller 207, and a second robot 208.

The conveyance apparatus 201 conveys a product including a transmission part, tableware, and a food tray from a first area 251 to a second area 252. The conveyance apparatus 201 can be, for example, a conveyor such as a chain conveyor, a roller conveyor, a screw conveyor, or an air floating conveyor. The conveyance apparatus 201 may be a belt conveyor. For example, a processing apparatus 231 that processes a product is arranged in the first area 251, and the product formed by the processing apparatus 231 and unloaded is discharged to the first area 251 of the conveyance apparatus 201.

Figure 6A:
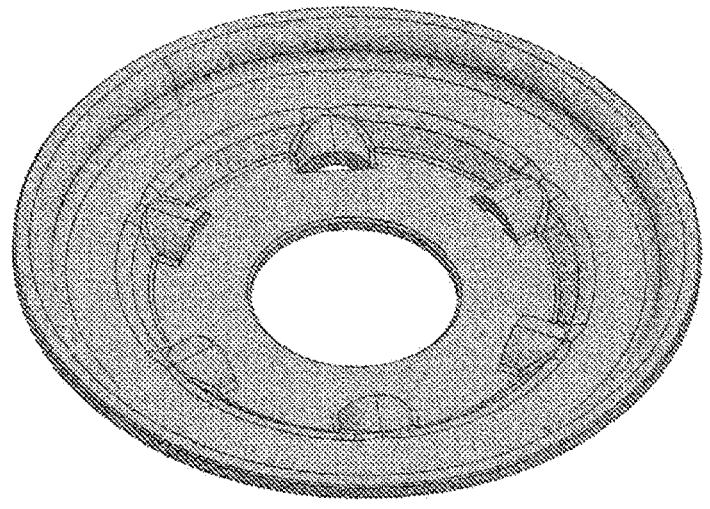
FIG. 6A is a photograph showing an example of a transmission part.
Figure 6B:
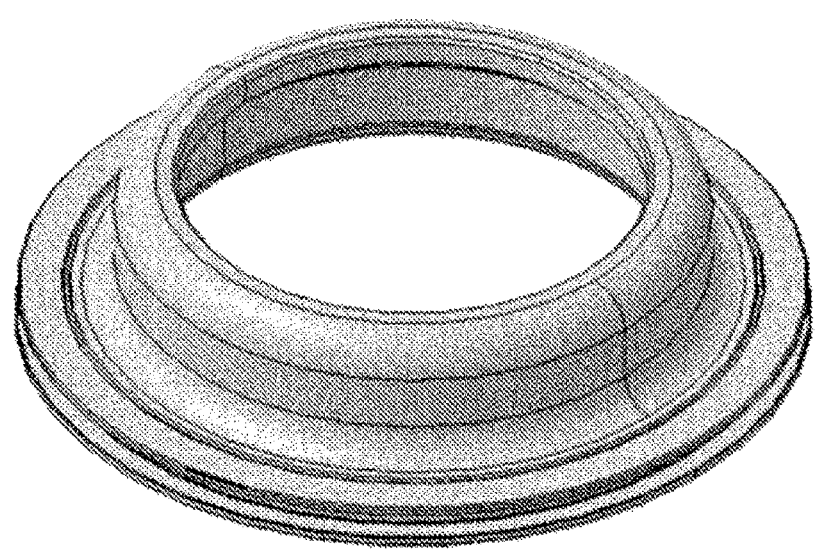
FIG. 6B is a photograph showing an example of a transmission part.

The product is, for example, a transmission part manufactured by press-forming a plate-shaped blank material made of steel (FIGS. 6A and 6B). The transmission part is a part used in an automobile. In this case, the processing apparatus 231 is a press forming machine. Also, the product is a transmission part washed by a washing machine and dried. In this case, the processing apparatus 231 is the washing machine. Alternatively, the product is tableware (dish) washed by a tableware washing machine and dried. In this case, the processing apparatus 231 is the tableware washing machine. Alternatively, the product is a food tray made of a resin, which is produced by a resin molding machine. In this case, the processing apparatus 231 is the resin molding machine. Also, the product can be a disc-shaped blank material produced by punching a rolled steel sheet using a press machine. In this case, the processing apparatus 231 is the press machine.

The relay table 202 is arranged on a side of the conveyance apparatus 201 in the second area 252. The container 203 is arranged in the second area 252 in a state in which the relay table 202 is sandwiched between the container 203 and the arrangement area of the conveyance apparatus 201. The container 203 can be, for example, a pallet table. Alternatively, the container 203 can be, for example, a cardboard box.

Figure 7:
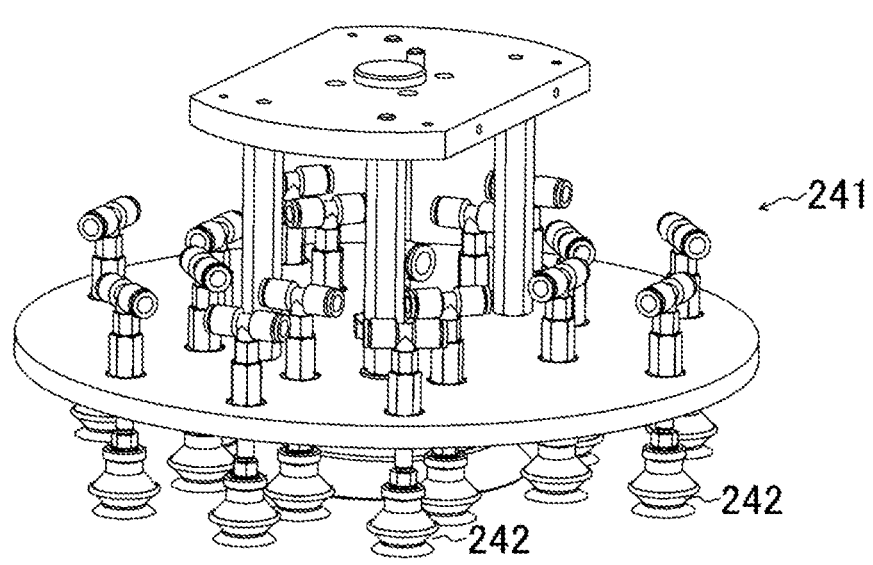
FIG. 7 is a perspective view showing the configuration of a suction head 241 provided on a first robot 204 of the palletizing system according to the second embodiment of the present invention.

The first robot 204 is arranged in association with the conveyance apparatus 201, and performs a first transfer operation of picking up the product being conveyed by the conveyance apparatus 201 and stacking it on the relay table 202. The first robot 204 is, for example, a parallel link robot. Also, the first robot 204 includes, for example, a vacuum suction type suction head 241 that picks up the product by suction, as shown in FIG. 7. The suction head 241 includes a plurality of suction pads 242.

The camera 205 captures the product being conveyed by the conveyance apparatus 201. The image processing apparatus 206 performs image measurement for the image captured by the camera 205. Based on the image measurement result by the image processing apparatus 206, the first controller 207 instructs the first robot 204 to perform the first transfer operation.

Also, as an image plan, for a product having a polygonal outer shape, the image processing apparatus 206 can rotate the product picked up by the first robot 204 in a plane such that the positions of sides on side portions match (overlap) in a state in which a plurality of products are stacked. For example, based on the image captured by the camera 205, the product is rotated such that the position of each side of the recognized outer shape is set in a set state. By the first transfer operation of the first robot 204 that operates based on the result of the image plan, in a loaded body of a plurality of polygonal products stacked on the relay table 202, the positions of the sides of the products substantially match. Note that the above-described operation is not necessary for a product having a circular shape (cylindrical shape) in a planar view.

If the camera 205 is formed by an area image sensor including 1,280·2,024 pixels, recognition of the outer shape of the product by the image processing apparatus 206 is possible. The larger the number of pixels of the area image sensor is, the more the identification accuracy of the outer shape of the product is improved, and the more the identification accuracy of the outer shape is improved.

Figure 8:
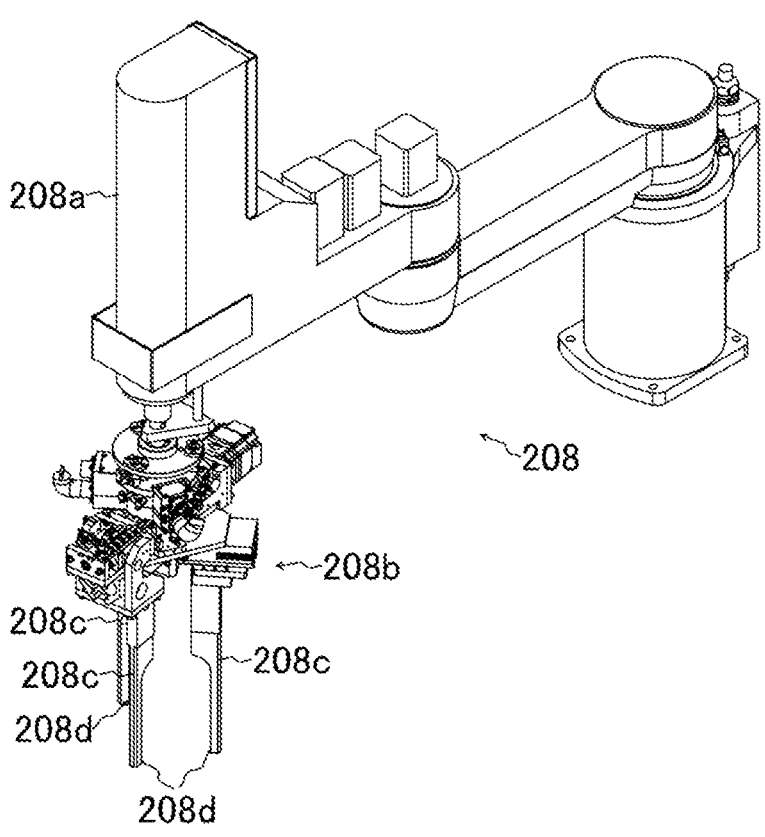
FIG. 8 is a perspective view showing a detailed example of the configuration of a second robot 208.

The second robot 208 performs a second transfer operation of transferring the loaded body of the plurality of products stacked on the relay table 202 to the container 203. The second robot 208 can be a robot including a robot arm for griping the loaded body. For example, as shown in FIG. 8, the second robot 208 is a horizontal articulated robot arm, and includes a lifting mechanism 208a at the arm distal end portion.

Also, the lifting mechanism 208a includes a robot hand 208b formed by three claw members 208c configured to grip the loaded body from side surfaces. Each claw member 208c includes, at the distal end, a claw portion 208d formed into an L shape. The claw member 208c extends downward from the robot hand 208b. The claw portion 208d extends in a direction substantially vertical to the extending direction of the claw member 208c toward the center of the robot hand 208b. The robot hand 208b clamps the loaded body from the side surfaces by the claw members 208c and makes the claw portions 208d hooked on the end portions of the lowermost surface of the loaded body, thereby gripping and transferring the loaded body. The materials and the shapes of the claw members 208c, the claw portions 208d, and the like can appropriately be designed based on the state of the product to be transferred. For example, the claw members 208c and the claw portions 208d can be made of plastic or elastomer. This configuration can prevent the product from being damaged.

Here, before the loaded body is gripped from the side surfaces by the robot hand, the second robot 208 performs a correction operation of correcting the disturbance of overlap in the loaded body by an operation of clamping the loaded body from the side surfaces by the three claw members 208c of the robot hand 208b, and then starts the gripping operation of the loaded body.

Also, the palletizing system can include a measuring apparatus 209 and a second controller 210. The measuring apparatus 209 measures the load amount of the plurality of products stacked on the relay table 202. If the load amount measured by the measuring apparatus 209 reaches a set value, the second controller 210 instructs the second robot 208 to perform the second transfer operation. For example, the load amount can be the number of the plurality of loaded products stacked on the relay table 202. Also, the load amount can be the weight (total weight) of the plurality of products stacked on the relay table 202.

For example, in a case where the product is the transmission part shown in FIG. 6A, if the number of loaded products counted by the measuring apparatus 209 reaches a set value of 10 to 12, the second controller 210 instructs the second robot 208 to perform the second transfer operation. If the loaded body is formed by such a number of transmission parts, the second transfer operation by the second robot 208 can sufficiently be performed.

For example, in a case where the product is the transmission part shown in FIG. 6B, if the number of loaded products counted by the measuring apparatus 209 reaches a set value of 3 to 5, the second controller 210 instructs the second robot 208 to perform the second transfer operation. If the loaded body is formed by such a number of transmission parts, the second transfer operation by the second robot 208 can sufficiently be performed.

In a case where the product is tableware (dish), if the number of loaded products counted by the measuring apparatus 209 reaches a set value of 10 to 15, the second controller 210 instructs the second robot 208 to perform the second transfer operation. If the loaded body is formed by such a number of dishes, the second transfer operation by the second robot 208 can sufficiently be performed.

In a case where the product is a food tray made of a resin, if the number of loaded products counted by the measuring apparatus 209 reaches a set value of 30 to 35, the second controller 210 instructs the second robot 208 to perform the second transfer operation. If the loaded body is formed by such a number of food trays made of a resin, the second transfer operation by the second robot 208 can sufficiently be performed.

The palletizing system also includes a third robot 211 provided on the relay table 202, and a third controller 212. If a new product is stacked on the loaded body already stacked on the relay table 202, the third controller 212 instructs the third robot 211 to perform the correction operation of correcting the disturbance of overlap in the loaded body. The third controller 212 grasps the stack of the new product based on, for example, the number of loaded products counted by the measuring apparatus 209.

Figure 9:
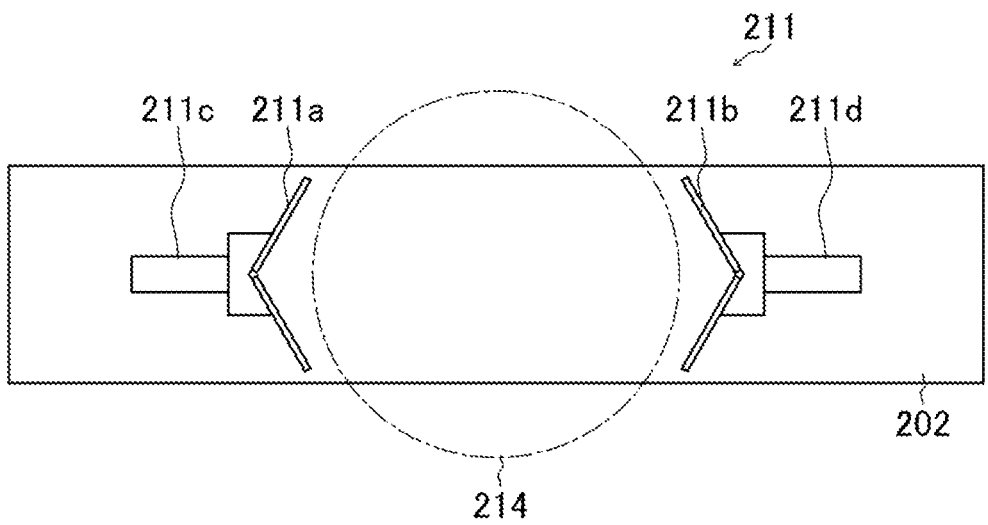
FIG. 9 is a plan view showing an example of the configuration of a third robot 211.

For example, as shown in FIG. 9, the third robot 211 includes a plurality of press plates 211a and 211b that move in directions for clamping a loaded body 214 of a plurality of products stacked on the relay table 202 from the side surfaces of the loaded body 214. The plurality of press plates 211a and 211b are moved by actuators 211c and 211d in the directions for clamping the loaded body 214 from the side surfaces, thereby executing the above-described correction operation. The actuators 211c and 211d have a capability of a maximum portable mass of about 40 kg in the horizontal direction.

Also, as described above, if the positions of the sides of products substantially match in the loaded body of the plurality of polygonal products stacked on the relay table 202, by the above-described correction operation of the third robot 211, even in a case of polygonal products, the disturbance of overlap in the loaded body can be eliminated to obtain a state in which the positions of the corresponding sides of the products match. In this state, a problem that a product falls in the second transfer operation by the above-described second robot 208 never arises.

Figure 10A:
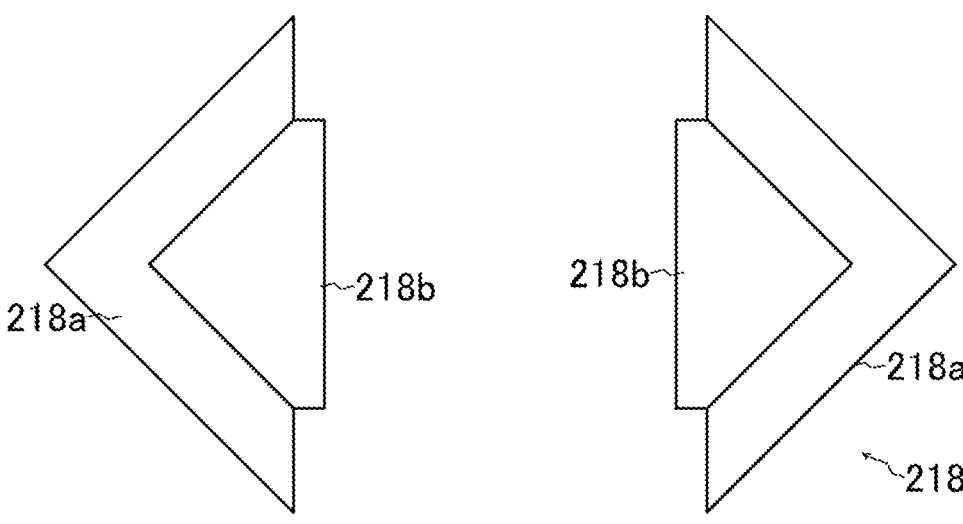
FIG. 10A is a plan view showing another example of the configuration of the second robot 208.
Figure 10B:
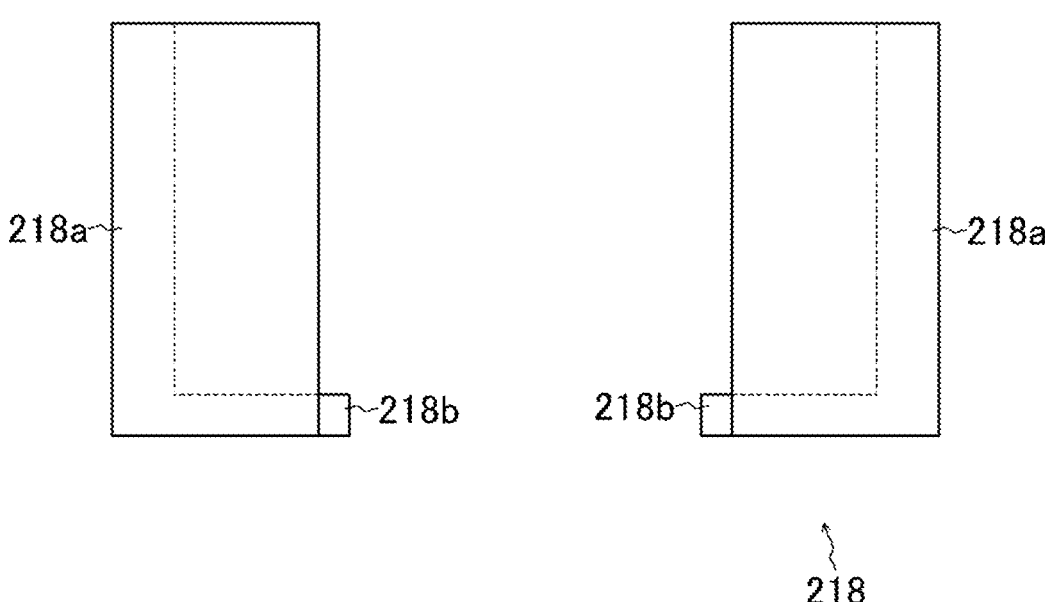
FIG. 10B is a side view showing another example of the configuration of the second robot 208.

As shown in FIGS. 10A and 10B, a robot hand 218 including holding portions 218a and claw portions 218b may be used as the second robot 208. For example, the holding portion 218a can be formed by two plate members that are parallel to a direction of raising the loaded body in the second transfer operation and are connected at an angle of about 45 in a planar view. Using the robot hand 218, the side surfaces of the loaded body are clamped by the holding portions 218a from two directions, and the bottom portion of the loaded body is supported by the claw portions 218b, thereby gripping the loaded body and executing the second transfer operation.

Also, the palletizing system includes an external appearance inspection apparatus 213 that inspects the external appearance of the product being conveyed by the conveyance apparatus 201 between the first area 251 and the second area 252. The external appearance inspection apparatus 213 performs image recognition of an external appearance image acquired by capturing the product being conveyed by the conveyance apparatus 201, thereby executing inspection of the external appearance of the product, such as the presence/absence of a flaw or a dirt state.

For example, the external appearance inspection apparatus 213 includes a linear image sensor, and a determination apparatus that determines the external appearance by processing an image captured by the linear image sensor. For example, the external appearance of the conveyed product is captured by the linear image sensor, and the external appearance is determined by the determination apparatus by performing pattern recognition using machine learning (deep machine learning) for the external appearance image obtained by the image capturing, thereby executing inspection of the external appearance of the product. The above-described linear image sensor can improve detection sensitivity for a fine flaw or dirt by, for example, setting the number of pixels to 6,000 or more.

In the above-described palletizing system, first, if the product punched by the processing apparatus 231 and unloaded is discharged to the first area 251 of the conveyance apparatus 201, the product is transported by the conveyance apparatus 201 in the direction of the second area 252. In this process, the external appearance inspection apparatus 213 inspects the external appearance of the product. A product determined as a failure in this inspection is removed from the conveyance apparatus 201.

Next, the product transported by the conveyance apparatus 201 is captured by the camera 205. The image (moving image) of the product under conveyance, which is captured by the camera 205, undergoes image measurement by the image processing apparatus 206. Based on the image measurement result by the image processing apparatus 206, the first controller 207 grasps the position of the conveyed product, and instructs the first robot 204 to perform the first transfer operation of the target product. In response to the instruction, the first robot 204 picks up the product being conveyed by the conveyance apparatus 201 and stacks it on the relay table 202.

By the above-described process, the products are stacked on the relay table 202 to form a loaded body. The measuring apparatus 209 counts the number of loaded products stacked on the relay table 202. If the count value (the number of loaded products) reaches a set value, the second controller 210 instructs the second robot 208 to perform the second transfer operation. In response to the instruction, the second robot 208 transfers the loaded body of the plurality of products stacked on the relay table 202 to the container 203. The second robot 208 loads the loaded body on a container placed on the container 203. The container is, for example, a box having a size of about 1,475 mm·2,120 mm in a planar view and a height (depth) of about 520 mm. The size of the container can appropriately be set based on the movable range of the second robot 208.

The second robot 208 first moves the arm distal end portion to above the loaded body, lowers the robot hand 208b by the lifting mechanism 208a, and grips the loaded body by the robot hand 208b. When the robot hand 208b grips the loaded body, the lifting mechanism 208a raises the robot hand 208b. Next, the second robot 208 moves the arm distal end portion to a predetermined position above the container 203, lowers the robot hand 208b by the lifting mechanism 208a, and places the gripped loaded body on the container 203. After that, the second robot 208 cancels the grip operation of the loaded body by the robot hand 208b and returns to the initial state.

Here, since a lot of products sequentially conveyed by the conveyance apparatus 201 are quickly transferred to the relay table 202 in the first transfer operation by the first robot 204, overlap in the loaded body is disturbed. If the loaded body is transferred to the container 203 in this state, the loaded body with the disturbance of overlap is loaded on the container 203. The loaded body is conveyed to the next step and used. In the next step, the product is picked up one by one from the loaded body. In the loaded body with the disturbance of overlap, the pickup position changes. In this state, for example, a problem such as a pickup failure occurs.

For this reason, it is important to correct the disturbance of overlap in the loaded body before the transfer to the next step. Before gripping the loaded body from the side surfaces by the robot hand 208b, the second robot 208 performs a correction operation of correcting the disturbance of overlap in the loaded body by an operation of clamping the loaded body from the side surfaces by the three claw members 208c of the robot hand 208b, and then starts the grip operation of the loaded body.

Since the above-described robot hand 208b cannot apply a large force in the clamping direction, it may be impossible to completely correct the disturbance of overlap in the loaded body. Hence, every time a new product is stacked on the loaded body already stacked on the relay table 202, the disturbance of overlap in the loaded body is corrected by the third robot 211. The third robot 211 can be specialized to the above-described correction of the disturbance of overlap in the loaded body and need not have a function of picking up the loaded body upward.

For example, the third robot 211 moves the plurality of press plates 211a and 211b by the actuators 211c and 211d in the direction of the loaded body 214 placed therebetween and clamps the loaded body 214 from the side surfaces by the press plates 211a and 211b, thereby correcting the disturbance of overlap in the loaded body 214. The actuators 211c and 211d can be, for example, arranged while being fixed on the relay table 202, and can perform the operation of clamping the loaded body 214 from the side surfaces with a stronger force by the press plates 211a and 211b. Hence, correction of the disturbance of overlap by a large deviation can be performed by using the third robot 211.

Thus, if the disturbance of overlap in the loaded body caused by a large deviation is corrected by the third robot 211, the disturbance of overlap in the loaded body can completely be corrected by the grip operation of the robot hand 208b of the second robot 208.

The palletizing system can be configured to include a plurality of first robots 204. In this case, the first controller 207 instructs each of the plurality of first robots 204 to perform the first transfer operation. Also, the palletizing system can include a plurality of relay tables 202. In this case, a plurality of containers 203 are provided in correspondence with the plurality of relay tables 202 provided. In addition, the second robot 208 is provided in correspondence with each of the plurality of relay tables 202 provided. In this configuration, the second controller 210 instructs each of the plurality of second robots 208 to perform the second transfer operation. Note that according to the palletizing system of the above-described second embodiment, since the relay table 202 is provided to enable quicker palletization, palletization corresponding to the processing speed (for example, production speed) of products can be performed in a small space without increasing the number of first robots 204.

Additionally, in the palletizing system, a reversing apparatus that reverses the product being conveyed by the conveyance apparatus 201 can be provided, for example, before the arrangement place of the camera 205. The reversing apparatus can be arranged, for example, between the external appearance inspection apparatus 213 and the camera 205. For example, the conveyance apparatus 201 is formed by a first conveyance apparatus on the processing apparatus side and a second conveyance apparatus on the side where the camera 205 and the like are arranged, and the reversing apparatus is provided between the first conveyance apparatus and the second conveyance apparatus.

The reversing apparatus can be formed by a rotation body including a plurality of radially provided radial storage portions and configured to receive a product loaded from the first conveyance apparatus one by one, reverse the product, and arrange it on the second conveyance apparatus. If one product is supplied from the delivery end of the first conveyance apparatus to a predetermined radial storage portion of the rotation body, the rotation body intermittently rotates by one section (one piece) in a predetermined direction in accordance with a product detection signal of a sensor. When the radial storage portion rotates by about 180 from the product receiving position, the product conveyed by the radial storage portion is arranged on the second conveyance apparatus.

As described above, according to the second embodiment, since the relay table is provided, and the loaded body of a plurality of products stacked on the relay table by the first robot is transferred to the container by the second robot, the product can be stacked on the container in correspondence with the processing speed of the products.

According to the second embodiment, as described above, since the relay table and the second robot are used, in the first robot, it is possible to perform control in which the blank materials being conveyed by the belt conveyor can be picked up more quickly by allowing disturbance of overlap to occur in the loaded body formed by stacking the products. In the first robot, it may be impossible to store more loaded bodies on a wider container because the moving range of the product is limited. However, according to the second embodiment, since the relay table and the second robot are used, the product (loaded body) can be moved to a range that cannot be reached only by the first robot, and therefore, more loaded bodies can be stored on a wider container.

Third Embodiment

An external appearance inspection apparatus according to the third embodiment of the present invention will be described next with reference to FIG. 11. The external appearance inspection apparatus is an external appearance inspection apparatus that performs image recognition of an external appearance image acquired by capturing a plate-shaped blank material 331 and thus performs inspection of the external appearance of the blank material 331, and includes a first belt conveyor 301, a second belt conveyor 302, a first camera 303, a first illumination 304, a second camera 305, and a second illumination 306.

The first belt conveyor 301 conveys the blank material 331. For example, the first belt conveyor 301 conveys a blank material punched by a press machine (not shown) and unloaded. The blank material 331 has, for example, a plate thickness of about 2.3 to 6 mm and a round or polygonal outer shape. There is also the blank material 331 having an annular shape with a hole at the center in a planar view.

The second belt conveyor 302 is arranged to continue from the first belt conveyor 301 while interposing a gap 321 therebetween, and conveys the blank material 331 conveyed by the first belt conveyor 301. The gap 321 is a slit-shaped portion extending in a direction vertical to the conveyance direction. The gap 321 can have a size about ¼ the diameter of the blank material 331. The second belt conveyor 302 conveys the blank material 331 to, for example, an area where a robot configured to pick up the blank material 331 and stack it on a pallet is arranged. The first belt conveyor 301 and the second belt conveyor 302 are arranged on, for example, a straight line.

The first camera 303 captures the obverse surface of the blank material 331 conveyed by the first belt conveyor 301 and the second belt conveyor 302, thereby acquiring the external appearance image of the obverse surface of the blank material 331. The first camera 303 is arranged on the upper side of the first belt conveyor 301 and the second belt conveyor 302. The image capturing point of the first camera 303 is arranged at a point deviated from above the gap 321 in the conveyance direction. For example, the first camera 303 is arranged above the first belt conveyor 301 deviated from the position of the gap 321 in the conveyance direction, and the image capturing point is set to an area immediately under the first camera 303. The first camera 303 can also be arranged above the second belt conveyor 302 deviated from the position of the gap 321 in the conveyance direction.

The first camera 303 can be formed by, for example, a linear image sensor. In the linear image sensor, the pixel array direction is a direction vertical to the conveyance direction of the first belt conveyor 301 and the second belt conveyor 302. The linear image sensor can improve detection sensitivity for a fine flaw or the like by, for example, setting the number of pixels to 4,000 or more.

The first illumination 304 is arranged on the upper side of the first belt conveyor 301 and the second belt conveyor 302. The first illumination 304 is a light source used to capture the obverse surface of the blank material 331 by the first camera 303. The first illumination 304 irradiates the obverse surface of the blank material 331 with first illumination light 304a from above the first belt conveyor 301 and the second belt conveyor 302. The first illumination 304 is an illumination for the image capturing point of the first camera 303, and the area of the gap 321 is not irradiated with the first illumination light 304a. Hence, since the first illumination light 304a does not intervene in image capturing by the second camera 305, the second camera 305 can obtain a clear image of the reverse surface of the blank material 331.

The second camera 305 captures, from the gap 321, the reverse surface of the blank material 331 conveyed by the first belt conveyor 301 and the second belt conveyor 302, thereby acquiring the external appearance image of the reverse surface of the blank material 331. The second camera 305 is arranged on the lower side of the first belt conveyor 301 and the second belt conveyor 302. The second camera 305 is arranged immediately under the gap 321. Also, the image capturing point of the second camera 305 is an area immediately above it.

The second camera 305 can be formed by, for example, a linear image sensor. In the linear image sensor, the pixel array direction is a direction vertical to the conveyance direction of the first belt conveyor 301 and the second belt conveyor 302. The linear image sensor can improve detection sensitivity for a fine flaw or the like by, for example, setting the number of pixels to 4,000 or more.

The second illumination 306 is arranged on the lower side of the first belt conveyor 301 and the second belt conveyor 302. The second illumination 306 is a light source used to capture the reverse surface of the blank material 331 by the second camera 305. The second illumination 306 irradiates the reverse surface of the blank material 331 with second illumination light 306a via the gap 321 from below the first belt conveyor 301 and the second belt conveyor 302. The second illumination 306, for example, changes the optical path by 90 by causing a half reflection mirror 307 to reflect the emitted second illumination light 306a, and irradiates the reverse surface of the blank material 331 via the gap 321 from below the gap 321. In this case, the second camera 305 captures the reverse surface of the blank material 331 via the half reflection mirror 307. Note that the illumination for the second camera 305 can have the same configuration as the first illumination 304 for the first camera 303. In this case, the half reflection mirror 307 is not necessary.

For this reason, in the area on the upper side of the first belt conveyor 301 and the second belt conveyor 302, an area deviated from the area on the upper side of the gap 321 is not irradiated with the second illumination light 306a. Hence, since the second illumination light 306a does not intervene in image capturing by the first camera 303 arranged at a point deviated from above the gap 321 in the conveyance direction, the first camera 303 can obtain a clear image of the obverse surface of the blank material 331. Note that as for the first illumination light 304a of the first illumination 304 as well, the optical path can be changed by 90 by causing a half reflection mirror to reflect the light, and for the image capturing area of the first camera 303, the obverse surface of the blank material 331 can be irradiated with the first illumination light 304a from immediately above, as described above.

Also, the external appearance inspection apparatus includes an inspection unit 308 that detects a defect of the blank material 331 based on a first external appearance image captured by the first camera 303 and a second external appearance image captured by the second camera 305. The inspection unit 308 detects a defect on the obverse surface of the blank material 331 based on the degree of matching in pattern recognition between the first external appearance image captured by the first camera 303 and a first reference image. In addition, the inspection unit 308 detects a defect on the reverse surface of the blank material 331 based on the degree of matching in pattern recognition between the second external appearance image captured by the second camera 305 and a second reference image. Also, the inspection unit 308 can perform inspection of the external appearance of the blank material 331 by performing pattern recognition using machine learning (deep machine learning) in each of the first external appearance image and the second external appearance image and thus determining the external appearance (detecting a defect).

As described above, according to the third embodiment, the first camera 303 can obtain a clear first external appearance image of the obverse surface of the blank material 331, and the second camera 305 can obtain a clear second external appearance image of the reverse surface of the blank material 331. Hence, the inspection unit 308 can perform, for example, correct pattern recognition or machine learning and perform correct defect detection.

A palletizing system using the external appearance inspection apparatus according to the third embodiment of the present invention will be described next. As described with reference to FIG. 5, the palletizing system includes a conveyance apparatus 201, a relay table 202, a container 203, a first robot 204, a camera 205, an image processing apparatus 206, a first controller 207, a second robot 208, a measuring apparatus 209, and a second controller 210.

The conveyance apparatus 201 is, for example, a belt conveyor, and conveys a plate-shaped blank material that is a product from a first area 251 to a second area 252. For example, a processing apparatus 231 that processes a product is arranged in the first area 251, and the product formed by the processing apparatus 231 and unloaded is discharged to the first area 251 of the conveyance apparatus 201.1

The product is a disc-shaped blank material produced by punching a rolled steel sheet using a press machine. For example, the blank material has, for example, a plate thickness of about 2.3 to 6 mm and a round or polygonal outer shape. There is also a blank material having an annular shape with a hole at the center in a planar view. In this case, the processing apparatus 231 is the press machine.

Also, the product can be a transmission part manufactured by press-forming a plate-shaped blank material made of steel. In this case, the processing apparatus 231 can be a press forming machine. Also, the product is a transmission part washed by a washing machine and dried. In this case, the processing apparatus 231 is the washing machine. Alternatively, the product is tableware (dish) washed by a tableware washing machine and dried. In this case, the processing apparatus 231 is the tableware washing machine. Alternatively, the product is a food tray made of a resin, which is produced by a resin molding machine. In this case, the processing apparatus 231 is the resin molding machine.

The relay table 202 is arranged on a side of the conveyance apparatus 201 in the second area 252. The container 203 is, for example, a pallet table, and is arranged in the second area 252 in a state in which the relay table 202 is sandwiched between the container 203 and the arrangement area of the conveyance apparatus 201.

The first robot 204 is arranged in association with the conveyance apparatus 201, and performs a first transfer operation of picking up the product (blank material) being conveyed by the conveyance apparatus 201 and stacking it on the relay table 202. The first robot 204 is, for example, a parallel link robot. Also, the first robot 204 includes, for example, a vacuum suction type suction head 241 that picks up the blank material by suction, as shown in FIG. 7. The suction head 241 includes a plurality of suction pads 242.

The camera 205 captures the product (blank material) being conveyed by the conveyance apparatus 201. The image processing apparatus 206 performs image measurement for the image captured by the camera 205. Based on the image measurement result by the image processing apparatus 206, the first controller 207 instructs the first robot 204 to perform the first transfer operation.

Also, as an image plan, for a product having a polygonal outer shape, the image processing apparatus 206 can rotate the product picked up by the first robot 204 in a plane such that the positions of sides on side portions match (overlap) in a state in which a plurality of products are stacked. For example, based on the image captured by the camera 205, the product is rotated such that the position of each side of the recognized outer shape is set in a set state. By the first transfer operation of the first robot 204 that operates based on the result of the image plan, in a loaded body of a plurality of polygonal blank materials stacked on the relay table 202, the positions of the sides of the blank materials substantially match. Note that the above-described operation is not necessary for a product (blank material) having a circular shape.

If the camera 205 is formed by an area image sensor including 1,280·3,024 pixels, recognition of the outer shape of the blank material by the image processing apparatus 206 is possible. The larger the number of pixels of the area image sensor is, the more the identification accuracy of the outer shape of the blank material is improved, and the more the identification accuracy of the outer shape is improved.

The second robot 208 performs a second transfer operation of transferring the loaded body of the plurality of blank materials stacked on the relay table 202 to the container 203. For example, as described with reference to FIG. 8, the second robot 208 is a horizontal articulated robot arm, and includes a lifting mechanism 208a at the arm distal end portion. The movable range of the arm distal end portion of the second robot 208 is about 1,200 mm in the rotating direction and about 2,400 mm in the expansion/contraction direction.

Also, the lifting mechanism 208a includes a robot hand 208b formed by three claw members 208c configured to grip the loaded body from side surfaces. Each claw member 208c includes, at the distal end, a claw portion 208d formed into an L shape. The claw member 208c extends downward from the robot hand 208b. The claw portion 208d extends in a direction substantially vertical to the extending direction of the claw member 208c toward the center of the robot hand 208b. The robot hand 208b clamps the loaded body from the side surfaces by the claw members 208c and makes the claw portions 208d hooked on the end portions of the lowermost surface of the loaded body, thereby gripping and transferring the loaded body. The length of the claw portion 208d is, for example, 2 mm. In addition, the robot hand 208b can grip/transfer a loaded body of blank materials having an outer diameter of 1,100 mm to 3,440 mm.

Here, before the loaded body is gripped from the side surfaces by the robot hand, the second robot 208 performs a correction operation of correcting the disturbance of overlap in the loaded body by an operation of clamping the loaded body from the side surfaces by the three claw members 208c of the robot hand 208b, and then starts the gripping operation of the loaded body.

The measuring apparatus 209 measures the load amount of the plurality of blank materials stacked on the relay table 202. If the load amount measured by the measuring apparatus 209 reaches a set value, the second controller 210 instructs the second robot 208 to perform the second transfer operation. For example, the load amount can be the number of the plurality of loaded blank materials stacked on the relay table 202. Also, the load amount can be the weight (total weight) of the plurality of blank materials stacked on the relay table 202. For example, if the number of loaded blank materials counted by the measuring apparatus 209 reaches a set value of 11 to 13, the second controller 210 instructs the second robot 208 to perform the second transfer operation. For such a number of blank materials, the second transfer operation by the second robot 208 can sufficiently be performed.

The palletizing system also includes a third robot 211 provided on the relay table 202, and a third controller 212. If a new blank material is stacked on the loaded body already stacked on the relay table 202, the third controller 212 instructs the third robot 211 to perform the correction operation of correcting the disturbance of overlap in the loaded body. The third controller 212 grasps the stack of the new blank material based on, for example, the number of loaded blank materials counted by the measuring apparatus 209.

For example, as described with reference to FIG. 9, the third robot 211 includes a plurality of press plates 211*a* and 211*b* that move in directions for clamping a loaded body 214 of a plurality of blank materials stacked on the relay table 202 from the side surfaces of the loaded body 214. The plurality of press plates 211*a* and 211*b* are moved by actuators 211*c* and 211*d* in the directions for clamping the loaded body 214 from the side surfaces, thereby executing the above-described correction operation. The actuators 211*c* and 211*d* have a capability of a maximum portable mass of about 40 kg in the horizontal direction.

Also, as described above, if the positions of the sides of blank materials substantially match in the loaded body of the plurality of polygonal blank materials stacked on the relay table 202, by the above-described correction operation of the third robot 211, even in a case of polygonal blank materials, the disturbance of overlap in the loaded body can be eliminated to obtain a state in which the positions of the corresponding sides of the blank materials match. In this state, a problem that a blank material falls in the second transfer operation by the above-described second robot 208 never arises.

Also, the palletizing system includes an external appearance inspection apparatus 213 that inspects the external appearance of the blank material being conveyed by the conveyance apparatus 201 between the first area 251 and the second area 252. The external appearance inspection apparatus 213 is the external appearance inspection apparatus according to the above-described third embodiment, and a detailed description thereof will be omitted. When using the external appearance inspection apparatus 213, the conveyance apparatus 201 is formed by a first belt conveyor and a second belt conveyor, and the second belt conveyor is arranged to continue from the first belt conveyor while interposing a gap therebetween.

In the above-described palletizing system, first, if the blank material punched by the processing apparatus 231 and unloaded is discharged to the first area 251 of the conveyance apparatus 201, the blank material is transported by the conveyance apparatus 201 in the direction of the second area 252. In this process, the external appearance inspection apparatus 213 inspects the external appearance of the blank material. A blank material determined as a failure in this inspection is removed from the conveyance apparatus 201.

Next, the blank material transported by the conveyance apparatus 201 is captured by the camera 205. The image (moving image) of the blank material under conveyance, which is captured by the camera 205, undergoes image measurement by the image processing apparatus 206. Based on the image measurement result by the image processing apparatus 206, the first controller 207 grasps the position of the conveyed blank material, and instructs the first robot 204 to perform the first transfer operation of the target blank material. In response to the instruction, the first robot 204 picks up the blank material being conveyed by the conveyance apparatus 201 and stacks it on the relay table 202.

By the above-described process, the blank materials are stacked on the relay table 202 to form a loaded body. The measuring apparatus 209 counts the number of loaded blank materials stacked on the relay table 202. If the count value (the number of loaded blank materials) reaches a set value, the second controller 210 instructs the second robot 208 to perform the second transfer operation. In response to the instruction, the second robot 208 transfers the loaded body of the plurality of blank materials stacked on the relay table 202 to the container 203. The second robot 208 loads the loaded body on a pallet placed on the container 203. The pallet is, for example, a box having a size of about 1,475 mm·1,120 mm in a planar view and a height (depth) of about 520 mm. The size of the pallet can appropriately be set based on the movable range of the second robot 208.

The second robot 208 first moves the arm distal end portion to above the loaded body, lowers the robot hand 208*b* by the lifting mechanism 208*a*, and grips the loaded body by the robot hand 208*b*. When the robot hand 208*b* grips the loaded body, the lifting mechanism 208*a* raises the robot hand 208*b*. Next, the second robot 208 moves the arm distal end portion to a predetermined position above the container 203, lowers the robot hand 208*b* by the lifting mechanism 208*a*, and places the gripped loaded body on the container 203. After that, the second robot 208 cancels the grip operation of the loaded body by the robot hand 208*b* and returns to the initial state.

Here, since a lot of blank materials sequentially conveyed by the conveyance apparatus 201 are quickly transferred to the relay table 202 in the first transfer operation by the first robot 204, overlap in the loaded body is disturbed. If the loaded body is transferred to the container 203 in this state, the loaded body with the disturbance of overlap is loaded on the container 203. The loaded body is conveyed to the next step and used. In the next step, the blank material is picked up one by one from the loaded body. In the loaded body with the disturbance of overlap, the pickup position changes. In this state, for example, a problem such as a pickup failure occurs.

For this reason, it is important to correct the disturbance of overlap in the loaded body before the transfer to the next step. Before gripping the loaded body from the side surfaces by the robot hand 208*b*, the second robot 208 performs a correction operation of correcting the disturbance of overlap in the loaded body by an operation of clamping the loaded body from the side surfaces by the three claw members 208*c* of the robot hand 208*b*, and then starts the grip operation of the loaded body.

Since the above-described robot hand 208*b* cannot apply a large force in the clamping direction, it may be impossible to completely correct the disturbance of overlap in the loaded body. Hence, every time a new blank material is stacked on the loaded body already stacked on the relay table 202, the disturbance of overlap in the loaded body is corrected by the third robot 211. The third robot 211 can be specialized to the above-described correction of the disturbance of overlap in the loaded body and need not have a function of picking up the loaded body upward.

For example, the third robot 211 moves the plurality of press plates 211*a* and 211*b* by the actuators 211*c* and 211*d* in the direction of the loaded body 214 placed therebetween and clamps the loaded body 214 from the side surfaces by the press plates 211*a* and 211*b*, thereby correcting the disturbance of overlap in the loaded body 214. The actuators 211*c* and 211*d* can be, for example, arranged while being fixed on the relay table 202, and can perform the operation of clamping the loaded body 214 from the side surfaces with a stronger force by the press plates 211*a* and 211*b*. Hence, correction of the disturbance of overlap by a large deviation can be performed by using the third robot 211.

Thus, if the disturbance of overlap in the loaded body caused by a large deviation is corrected by the third robot 211, the disturbance of overlap in the loaded body can completely be corrected by the grip operation of the robot hand 208*b* of the second robot 208.

The palletizing system can be configured to include a plurality of first robots 204. In this case, the first controller 207 instructs each of the plurality of first robots 204 to perform the first transfer operation. Also, the palletizing system can include a plurality of relay tables 202. In this case, a plurality of containers 203 are provided in correspondence with the plurality of relay tables 202 provided. In addition, the second robot 208 is provided in correspondence with each of the plurality of relay tables 202 provided, and the second controller 210 instructs each of the plurality of second robots 208 to perform the second transfer operation. Note that according to the palletizing system of the above-described third embodiment, since the relay table 202 is provided to enable quicker palletization, palletization corresponding to the production speed of blank materials can be performed in a small space without increasing the number of first robots 204.

Additionally, in the palletizing system, a reversing apparatus that reverses the blank material being conveyed by the conveyance apparatus 201 can be provided, for example, before the arrangement place of the camera 205. The reversing apparatus can be arranged, for example, between the external appearance inspection apparatus 213 and the camera 205. For example, the conveyance apparatus 201 is formed by a preceding stage belt conveyor on the press machine side and a succeeding stage belt conveyor on the side where the camera 205 and the like are arranged, and the reversing apparatus is provided between the preceding stage belt conveyor and the succeeding stage belt conveyor. The reversing apparatus can be arranged, for example, on the side of the processing apparatus 231 with respect to the external appearance inspection apparatus 213.

The reversing apparatus can be formed by a rotation body including a plurality of radially provided radial storage portions and configured to receive a blank material loaded from the preceding stage belt conveyor one by one, reverse the blank material, and arrange it on the succeeding stage belt conveyor. If one blank is supplied from the delivery end of the first conveyance to a predetermined radial storage portion of the rotation body, the rotation body intermittently rotates by one section (one piece) in a predetermined direction in accordance with a blank detection signal of a sensor. When the radial storage portion rotates by about 180 from the blank receiving position, the blank conveyed by the radial storage portion is arranged on the succeeding stage belt conveyor.

For example, the cut surface of a blank material punched by the processing apparatus 231 and unloaded is sometimes not vertical but tilted with respect to the plane of the blank material. If the next step is performed in a state in which the tilt is in the punching direction, a defect may occur. Hence, in the next step, the state of the cut surface of the blank material is confirmed, and the blank material is reversed as needed, resulting in a load in work. However, if the blank material is reversed by the above-described reversing apparatus to form the loaded body, reduction of the load in work or solution of a problem in the next step can be implemented.

As described above, according to the palletizing system of the third embodiment, since the relay table is provided, and the loaded body of a plurality of blank materials stacked on the relay table by the first robot is transferred to the pallet table by the second robot, the blank material can be stacked on the pallet in correspondence with the production speed of the blank materials.

According to the palletizing system, as described above (as in the first and second embodiments), since the relay table and the second robot are used, in the first robot, it is possible to perform control in which the products, which are blank materials, being conveyed by the belt conveyor can be picked up more quickly by allowing disturbance of overlap to occur in the loaded body formed by stacking the blank materials. In the first robot, it may be impossible to store more loaded bodies on a wider pallet table because the moving range of the product is limited. However, according to the present invention, since the relay table and the second robot are used, the blank material (loaded body) can be moved to a range that cannot be reached only by the first robot, and therefore, more loaded bodies can be stored on a wider pallet table.

Figures 11, 12:
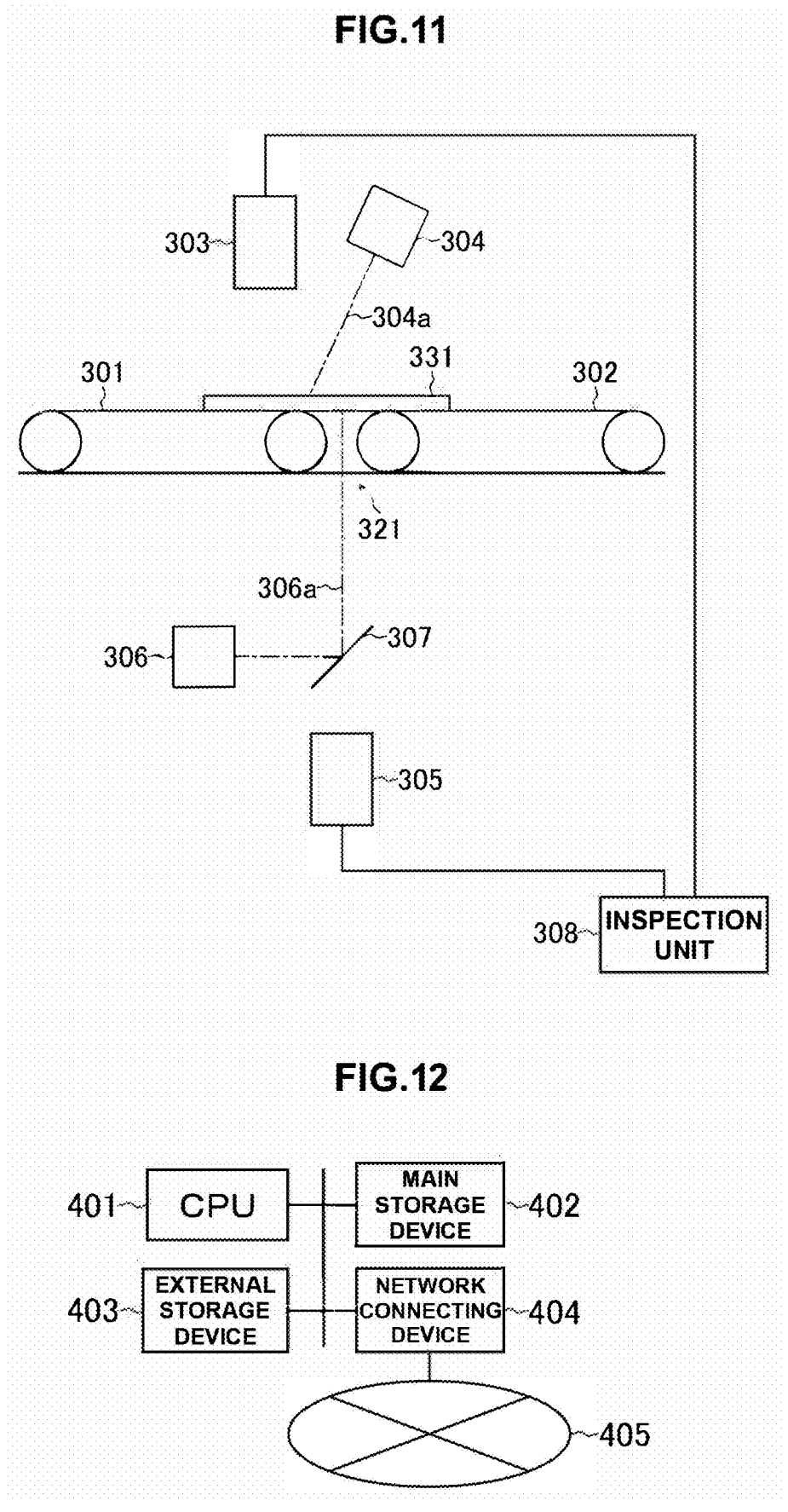
FIG. 11 is a view showing the configuration of an external appearance inspection apparatus according to the third embodiment of the present invention.
FIG. 12 is a view showing the hardware configuration of the external appearance inspection apparatus according to the third embodiment of the present invention.

Note that the inspection unit according to the above-described third embodiment may be a computer apparatus including a CPU (Central Processing Unit) 401, a main storage device 402, an external storage device 403, and a network connecting device 404, as shown in FIG. 12, and the functions of the above-described inspection unit may be implemented by the CPU 401 operating (executing a program) in accordance with a program expanded on the main storage device 402. The program is a program configured to cause the computer to perform the functions of the inspection unit. The network connecting device 404 is connected to a network 405. The functions can also be distributed to a plurality of computer apparatuses.

As described above, according to the third embodiment, since the image capturing point of the first camera for inspection on the obverse surface side of a blank material is arranged at a point deviated from above the gap in the conveyance direction, external appearance inspection of both surfaces of the blank material can be performed more correctly.

Note that the present invention is not limited to the above-described embodiments, and it is obvious that many modifications and combinations can be made within the technical scope of the present invention by those who have normal knowledge in this field.

EXPLANATION OF THE REFERENCE NUMERALS AND SIGNS

101 . . . belt conveyor, 102 . . . relay table, 103 . . . pallet table, 104 . . . first robot, 105 . . . camera, 106 . . . image processing apparatus, 107 . . . first controller, 108 . . . second robot, 108a . . . lifting mechanism, 108b . . . robot hand, 108c . . . claw member, 108d . . . claw portion, 109 . . . measuring apparatus, 110 . . . second controller, 111 . . . third robot, 112 . . . third controller, 113 . . . external appearance inspection apparatus, 131 . . . press machine, 151 . . . first area, 152 . . . second area, 201 . . . conveyance apparatus, 202 . . . relay table, 203 . . . container, 204 . . . first robot, 205 . . . camera, 206 . . . image processing apparatus, 207 . . . first controller, 208 . . . second robot, 208a . . . lifting mechanism, 208b . . . robot hand, 208c . . . claw member, 208d . . . claw portion, 209 . . . measuring apparatus, 210 . . . second controller, 211 . . . third robot, 212 . . . third controller, 213 . . . external appearance inspection apparatus, 231 . . . processing apparatus, 251 . . . first area, 252 . . . second area, 301 . . . first belt conveyor, 302 . . . second belt conveyor, 303 . . . first camera, 304 . . . first illumination, 304a . . . first illumination light, 305 . . . second camera, 306 . . . second illumination, 306a . . . second illumination light, 307 . . . half reflection mirror, 308 . . . inspection unit, 321 . . . gap, 331 . . . blank material.

The invention claimed is:

1. A palletizing system comprising:

a conveyance apparatus configured to convey a product from a first area to a second area;

a relay table arranged beside the conveyance apparatus in the second area;

a container arranged in the second area in a state in which the relay table is located between the container and an arrangement area of the conveyance apparatus;

a first robot arranged in association with the conveyance apparatus and configured to perform a first transfer operation of picking up the product being conveyed by the conveyance apparatus and stacking the product on the relay table;

a camera configured to capture the product being conveyed by the conveyance apparatus;

an image processing apparatus configured to perform image measurement for an image captured by the camera;

a first controller configured to instruct the first robot to perform the first transfer operation based on an image measurement result by the image processing apparatus; and a second robot configured to perform a second transfer operation of transferring a loaded body of a plurality of products stacked on the relay table to the container.

2. The palletizing system according to claim 1, further comprising:

a measuring apparatus configured to measure a load amount of the plurality of products stacked on the relay table; and a second controller configured to instruct the second robot to perform the second transfer operation when the load amount measured by the measuring apparatus reaches a set value.

3. The palletizing system according to claim 2, wherein the loaded amount is the number of the plurality of products stacked on the relay table.

4. The palletizing system according to claim 1, wherein the second robot includes a robot hand formed by three claw members configured to grip the loaded body from side surfaces, and each claw member includes, at a distal end, a claw portion formed into an L shape.

5. The palletizing system according to claim 4, wherein before the loaded body is gripped from the side surfaces by the robot hand, the second robot performs a correction operation of correcting a disturbance of overlap in the loaded body by an operation of clamping the loaded body from the side surfaces by the robot hand, and then starts a gripping operation of the loaded body.

6. The palletizing system according to claim 1, further comprising:

a third robot provided on the relay table; and a third controller configured to, when a new product is stacked on the loaded body already stacked on the relay table, instruct the third robot to perform the correction operation of correcting the disturbance of overlap in the loaded body, wherein the third robot includes a plurality of press plates configured to move in directions for clamping the loaded body of the plurality of products stacked on the relay table from the side surfaces of the loaded body, and moves the plurality of press plates in the directions for clamping the loaded body from the side surfaces, thereby executing the correction operation.

7. The palletizing system according to claim 1, further comprising an external appearance inspection apparatus configured to inspect an external appearance of the product being conveyed by the conveyance apparatus between the first area and the second area.

8. The palletizing system according to claim 7, wherein the external appearance inspection apparatus performs image recognition of an external appearance image acquired by capturing the product being conveyed by the conveyance apparatus, thereby executing inspection of the external appearance of the product.

9. The palletizing system according to claim 8, wherein the external appearance inspection apparatus performs the inspection of the external appearance of the blank material based on a degree of matching in pattern recognition between the external appearance image and a reference image.

10. The palletizing system according to claim 1, wherein the first robot includes a suction head configured to pick up the blank material by suction.

11. The palletizing system according to claim 1, wherein the first robot includes a plurality of robots, and the first controller instructs each of the plurality of first robots to perform the first transfer operation.

12. The palletizing system according to claim 1, wherein the relay table includes a plurality of tables, the container includes a plurality of containers in correspondence with the plurality of relay tables provided, and the second robot is provided in correspondence with each of the plurality of relay tables provided.

13. The palletizing system according to claim 1, wherein the conveyance apparatus is a conveyor.

14. The palletizing system according to claim 13, wherein the conveyance apparatus is at least one of a chain conveyor, a roller conveyor, a screw conveyor, and an air floating conveyor.

15. The palletizing system according to claim 1, wherein the product is at least one of a transmission part, tableware, a food tray, and a plate-shaped blank material.

* * * * *